United States Patent
Biskeborn

(12) 
(10) Patent No.: US 7,359,156 B2
(45) Date of Patent: *Apr. 15, 2008

(54) MAGNETIC TAPE HEAD SYSTEM METHOD SPECIFYING PARAMETERS FOR NEAR-CONSTANT RESOLUTION AT VARYING TAPE VELOCITIES

(75) Inventor: Robert Glenn Biskeborn, Hollister, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 11/619,577

(22) Filed: Jan. 3, 2007

(65) Prior Publication Data

US 2007/0137023 A1    Jun. 21, 2007

Related U.S. Application Data

(62) Division of application No. 10/255,858, filed on Sep. 26, 2002, now Pat. No. 7,193,813.

(51) Int. Cl.
*G11B 5/48* (2006.01)
*G11B 5/265* (2006.01)
*G11B 5/187* (2006.01)
*G11B 15/60* (2006.01)

(52) U.S. Cl. .................. 360/241.1; 360/121; 360/122; 360/130.21; 29/603.05

(58) Field of Classification Search ............... 360/121, 360/122, 125, 129, 241.1, 130.21; 29/603.05
See application file for complete search history.

(56) References Cited

U.S. PATENT DOCUMENTS

| 5,307,227 A * | 4/1994 | Okada et al. ............... 360/122 |
| 6,590,741 B1 * | 7/2003 | Hasegawa et al. .......... 360/122 |
| 7,193,813 B2 * | 3/2007 | Biskeborn .................... 360/122 |

FOREIGN PATENT DOCUMENTS

DE          3707535 A1 *  9/1987
JP          05266414 A  * 10/1993

* cited by examiner

*Primary Examiner*—Craig A. Renner
(74) *Attorney, Agent, or Firm*—Zilka-Kotab, PC

(57) ABSTRACT

A magnetic tape head system and associated method are disclosed. Included is one or more head assemblies each including a base with a row bar coupled thereto with a head situated therein for defining a tape bearing surface defining a tape wrap angle with respect to a horizontal plane. A length of the tape bearing surface is between approximately 0.57 millimeters and 0.7 millimeters and the tape wrap angle is between approximately 0.5 degrees and 1.3 degrees such that a resolution of the magnetic tape head system is substantially independent of a velocity of the tape.

14 Claims, 6 Drawing Sheets

MAGNETIC TAPE HEAD SYSTEM METHOD SPECIFYING PARAMETERS FOR NEAR-CONSTANT RESOLUTION AT VARYING TAPE VELOCITIES

RELATED APPLICATIONS

This application is a divisional of U.S. patent application Ser. No. 10/255,858, filed Sep. 26, 2002 now U.S. Pat. No. 7,193,813.

FIELD OF THE INVENTION

The present invention relates to magnetic recording heads, and more particularly, this invention relates to flat profile tape recording heads.

BACKGROUND OF THE INVENTION

Prior Art FIG. 1 illustrates a traditional flat-lapped bi-directional, two-module magnetic tape head 100, in accordance with the prior art. As shown, a pair of bases 102 is equipped with row bars 104 each including a substrate 104A and a closure 104B with readers and writers 106 situated therebetween. In use, a tape 108 is moved over the row bars 104 along a tape bearing surface 109 in the manner shown for reading and writing data on the tape 108 using the readers and writers 106. Conventionally, a partial vacuum is formed between the tape 108 and the tape bearing surface 109 for maintaining the tape 108 in communication with the readers and writers 106. More information regarding such flat-lapped magnetic tape head may be found with reference to U.S. Pat. No. 5,905,613, which is incorporated herein by reference.

Two common parameters are associated with heads of such design. One parameter includes the tape wrap angle 110 defined between a horizontal plane and a plane 111 in which the upper surface of the tape bearing surface 109 resides. It should be noted that the tape wrap angle 110 includes an internal wrap angle which is often similar in degree to an external wrap angle 115. Moreover, a tape bearing surface length 112 is defined as the distance (in the direction of tape travel) between edges of the tape bearing surface 109. Such parameters are often adjusted to deal with various operational aspects of heads such as that of Prior Art FIG. 1, in a manner that will soon become apparent.

During use of the head FIG. 1, various effects traditionally occur. Prior Art FIG. 2A is an enlarged view of the area encircled in FIG. 1 that illustrates a first known effect associated with the use of the head 100 of FIG. 1. As shown, tents 202 form in the tape 108 on opposite edges of the tape bearing surface 109.

Prior Art FIG. 2B is a cross-sectional view of the head 100 of FIG. 1 taken along the illustrated line of FIG. 2A. As shown, tape lifting 204 occurs along side edges of the tape bearing surface 109 as a result of air leaking in at the edges and tape mechanical effects. Lifting adversely affects the end portions of the readers and writers 106. Still yet, the tape lifting 204 results in additional stress at points 206 which, in turn, causes additional wear. Further augmenting such tape lifting 204 is the fact that the tape 108 naturally has upturned edges due to widespread use of technology applied in the video tape arts.

During the design of the tape heads like that of FIG. 1, the tape bearing surface length 112 and tape wrap angle 110 may be varied to minimize the impact of some of the foregoing effects. For example, it is desirable that the tape bearing surface length 112 be elongated in order to reduce interaction of the aforementioned tents 202, which may, in turn, significantly reduce the proper communication between the tape 108 and the readers and writers 106. Moreover, wear of the edges of the tape bearing surface 109 may result in shortening of the tape bearing surface length 112 over time. Thus, if the tape bearing surface length 112 is, at one time, sufficient to reduce the foregoing interaction, the shortening of the tape bearing surface length 112 may prompt such interaction over time. On the other hand, it is also desirable that the tape bearing surface length 112 be shortened to reduce the aforementioned lifting at the tape edges set forth during reference to FIG. 2B.

With respect to the tape wrap angle 110, there is a desire to increase such angle to combat the "edge loss" affect associated with the tape lifting 204 of FIG. 2B. On the other hand, there is a desire to minimize such tape wrap angle 110 to minimize the lateral extent (length in the direction of the tape motion) of the tents 202 of FIG. 2A.

The balancing of the foregoing aspects has resulted in the design of tape heads 100 with a tape bearing surface length 112 of approximately 0.8 mm, and a tape wrap angle 110 of approximately 1.8 degrees.

Recently, studies have shown that high frequency output of traditional flat-lapped bi-directional, two-module magnetic tape heads, with certain tapes, can vary with tape speed. In particular, increasing tape speed of those tapes causes an increase in fly height, and thus a decrease in high frequency output. Still yet, this effect is lessened with continued use of that particular tape sample. FIG. 2C illustrates such a relationship between the resolution (i.e. ratio of high frequency to low frequency output) of the tape head 100 and a velocity of the tape 108. While this effect is obscured to a small extent with many media, it is particularly pronounced for other media.

Thus, as tape speed increases, resolution decreases because of this effect. Changes in resolution generally require changes in read equalization to keep error rates low, especially for partial response maximum likelihood (PRML) channels. This means that in applications requiring "speed matching" in which drive speed varies in response to user-attached system speed, error rates may change with tape speed. It is common goal that error rates be maintained at lowest possible levels under all operating conditions.

The origin of this effect (fly height or resolution vs. speed) is not fully understood. There has been a suggestion that it is related to viscoelastic stiffening of certain tapes as speed increases. There is thus a need for a head that addresses this problem of certain tapes, and gives a substantial improvement.

Fundamentally, the relationship shown in FIG. 2C appears to be a wrap angle-controlled effect. At larger tape wrap angles, the speed effect is more pronounced than at lower wrap angles with the affected tapes.

As mentioned earlier, tape "tents" form on each edge of a head. See FIG. 2A. The greater the wrap angle, the higher and longer the tent. Modeling and experiments have shown that at any tape speed larger tents tend to suck more air into the head-tape interface and thus results in an increase in head-tape separation in the region of the recording head.

For given geometrical wrap angles, stiffer tapes will have larger tents. If the tape appears dynamically stiffer as speed increases due to viscoelasticity, larger tents and a greater fly height may result. In any case, shallow wrap angles give lower and less speed dependent fly heights.

Most tapes are manufactured with "cupping," which is the tendency for the tape surface to be convex when viewed from the magnetic coating side. This property, which is needed for helical scan applications to prevent the heads from knicking the tape edges, coupled with anticlastic bending and side air leakage, tends to make the edges curl away from the flat head surfaces. This is particularly a concern when there are servo tracks near the edges of the tape, such as with Linear Tape Open (LTO) standard tapes.

Increasing the tape wrap angle tends to "straighten" the wrapping and generally reduce edge lifting, but this has the negative effect already described hereinabove.

DISCLOSURE OF THE INVENTION

A magnetic tape head system and associated method are disclosed. Included is one or more head assemblies each including a base with a row bar coupled thereto with a head situated therein for defining a tape bearing surface over which a tape is adapted to pass during use of the magnetic tape head system.

In one embodiment, a length of the tape bearing surface may be selected such that a resolution of the magnetic tape head system is substantially independent of a velocity of the tape. Such tape bearing surface length may be defined as a distance between edges of the tape bearing surface, along a direction in which the tape moves. As an option, the length of the tape bearing surface may be selected to be between approximately 0.57 millimeters and 0.7 millimeters. Still yet, the length of the tape bearing surface may be selected to be substantially 0.63 millimeters.

The present embodiment solves the problems of the prior art by shortening the tape bearing length in the direction of tape travel. A shorter length makes a given wrap angle more effective at straightening with respect to the curl, as the head tends to behave more like a smaller radius cylinder.

In another embodiment, a tape wrap angle may be defined by the tape bearing surface. In particular, the tape wrap angle may be defined by a horizontal plane and a plane in which the tape bearing surface resides. As an option, the tape wrap angle may be selected to be between approximately 0.5 degrees and 1.3 degrees. Moreover, the tape wrap angle may be selected to be between approximately 0.8 degrees and 0.9 degrees.

Also provided is a magnetic tape drive for use with a magnetic recording tape. Included is a tape drive system for moving the magnetic recording tape linearly and bidirectionally. Associated therewith is one or more head assemblies each including a base with a row bar coupled thereto with a head situated therein for defining a tape bearing surface which, in turn, defines a tape wrap angle with respect to a horizontal plane. A length of the tape bearing surface is selected to be between approximately 0.57 millimeters and 0.7 millimeters and the tape wrap angle is selected to be between approximately 0.5 degrees and 1.3 degrees. Further included is at least one outrigger for defining an angle in which the tape approaches the head.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

Prior Art

Prior Art

Prior Art

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 3:
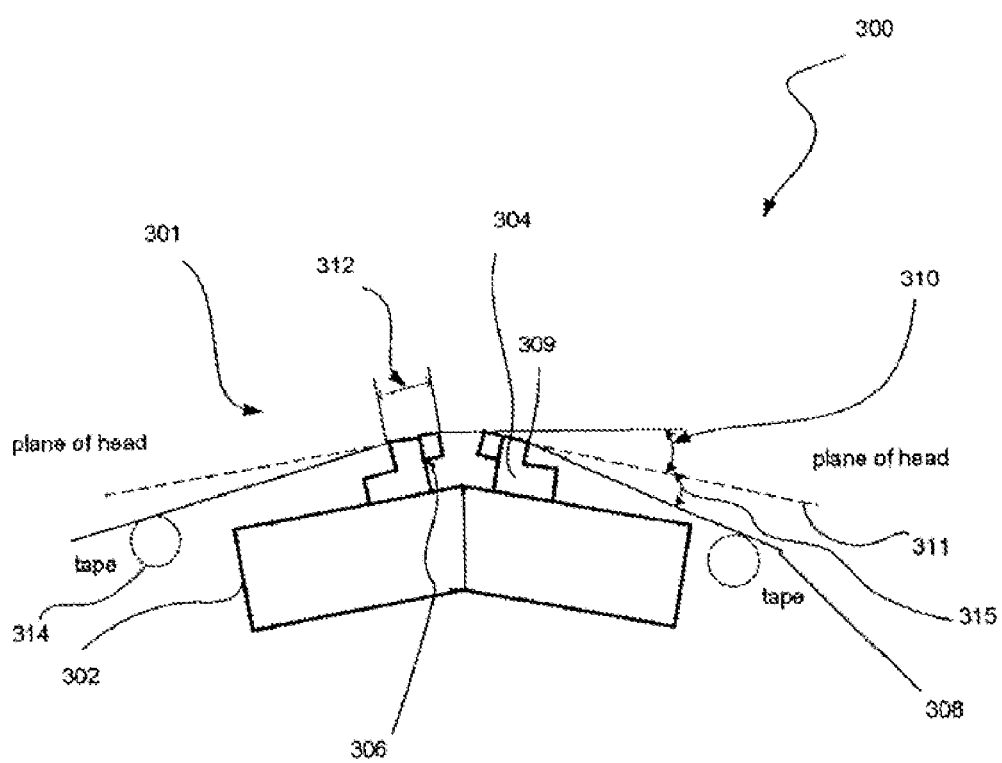
FIG. 3 illustrates a flat-lapped magnetic tape head system, in accordance with one embodiment.

FIG. 3 illustrates a flat-lapped magnetic tape head system 300, in accordance with one embodiment. As shown, a pair of head assemblies 301 is provided each with a base 302 that is equipped with a row bar 304 each including a substrate and a closure with a reader/writer head 306 situated therebetween. The row bar 304 and the base 302 may be integrally coupled as a unitary unit or include two separate components coupled together. In the context of the present description, the row bar 304 may include any portion of the head assemblies 301 to which the head 306 is attached.

A tape 308 is moved along a tape bearing surface 309 in the manner shown for reading and writing data on the tape 308 using the reader/writer head 306. While a pair of head assemblies 301 is set forth herein, it should be noted that one or more head assemblies 301 (i.e. 1, 3, etc.) may be provided per the desires of the user.

In use, a partial vacuum is formed between the tape 308 and the tape bearing surface 309. Such partial vacuum works to maintain the tape 308 in communication with the reader/writer head 306. More information reading the manufacture, operation, and use of such a flat-lapped magnetic tape head may be found with reference to U.S. Pat. No. 5,905,613, which is incorporated herein by reference.

Figure 1:
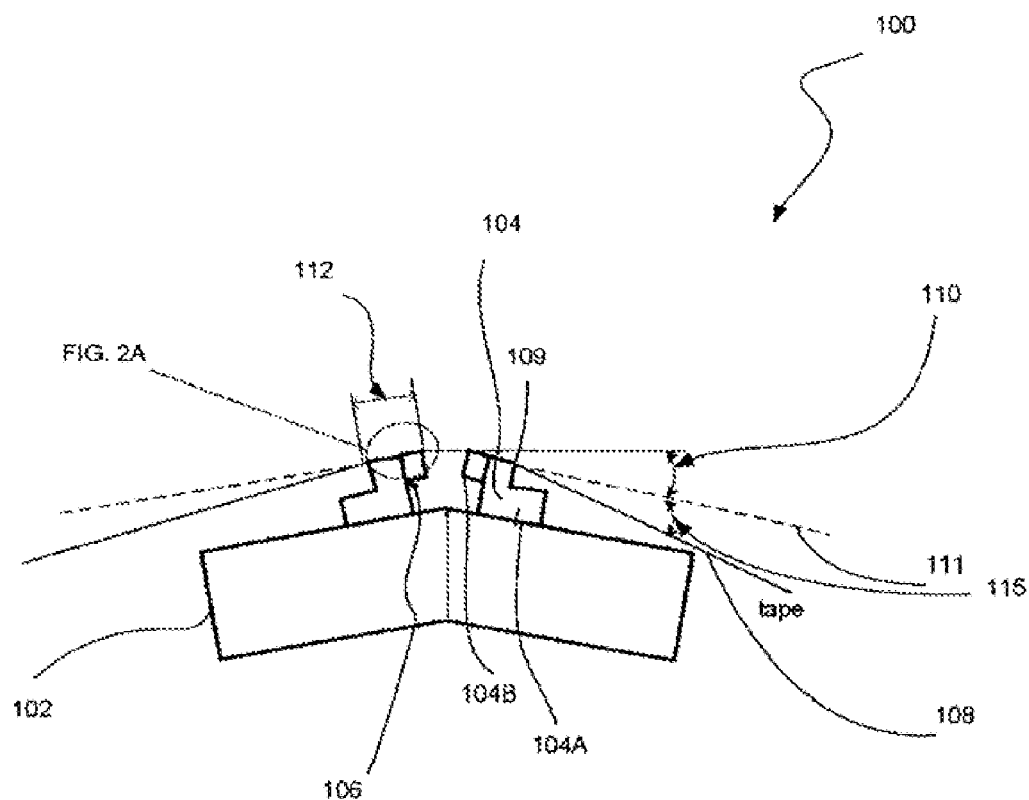
FIG. 1 illustrates a traditional flat-lapped magnetic tape head, in accordance with the prior art.
Figure 2A:
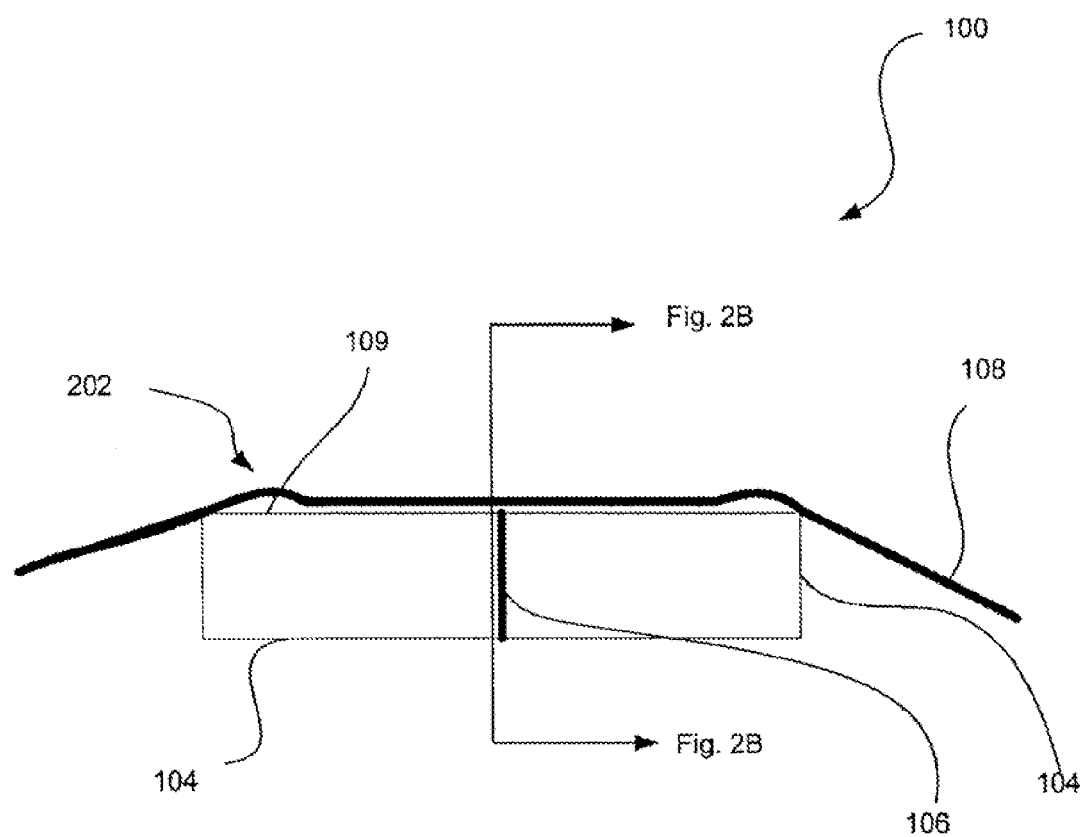
FIG. 2A is an enlarged view of the area encircled in FIG. 1 that illustrates a first known effect associated with the use of the head of FIG. 1.
Figure 2B:
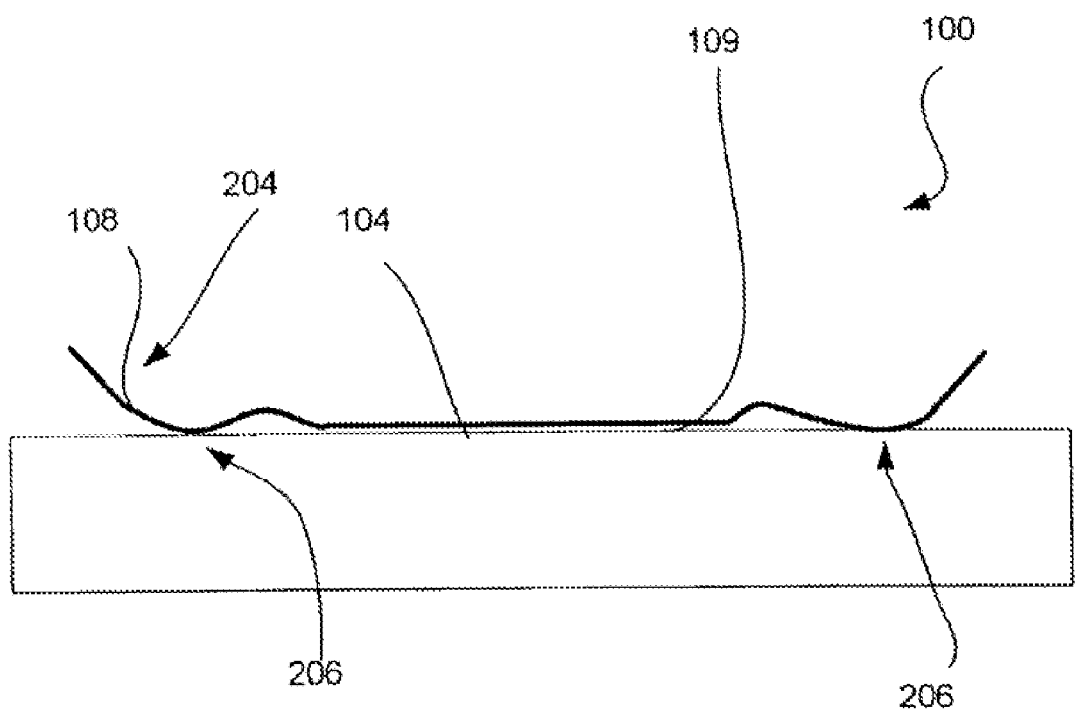
FIG. 2B is a cross-sectional view of a magnetic tape head taken along the illustrated line of FIG. 2A, showing a second known effect associated with the use of the head of FIG. 1.
Figure 2C:
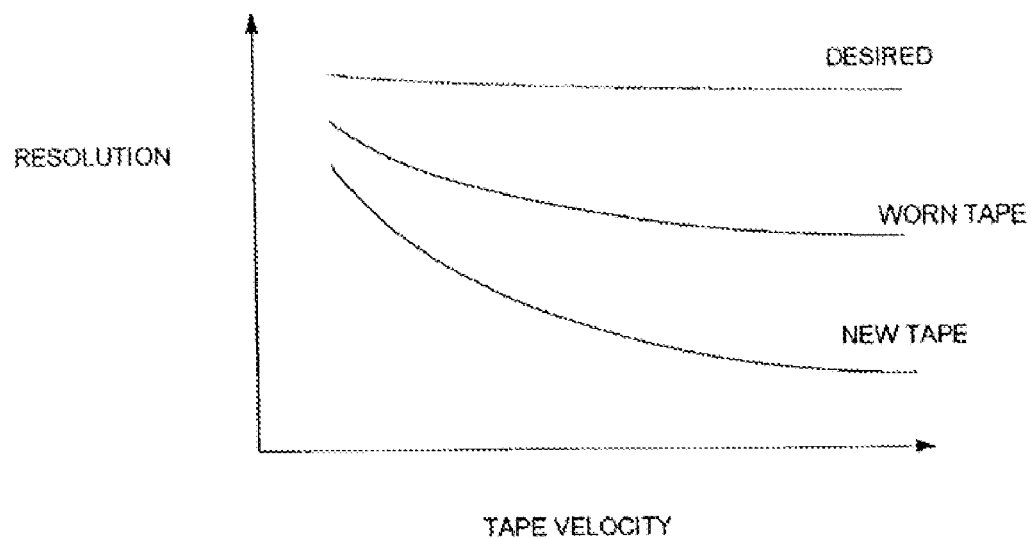
FIG. 2C illustrates a relationship between a resolution of a magnetic tape head and a velocity of an associated tape.

To lessen the undesired relationship between a resolution of the magnetic tape head system 300 and a velocity of the tape 308 (See FIG. 2C), various parameters such as the tape wrap angle (i.e. internal wrap angle) 310 and the tape bearing surface length 312 may be adjusted. It should be noted that, in one embodiment, the tape wrap angle 310 includes an internal wrap angle which is often similar in degree to an external wrap angle 315.

In one embodiment, a length of the tape bearing surface 309 may be selected such that the resolution of the magnetic tape head system 300 is substantially independent of the velocity of the tape 308. Such tape bearing surface length 312 may be defined as a distance between edges of the tape bearing surface 309, along a direction in which the tape 308 moves. As an option, the length of the tape bearing surface 309 may be selected to be between approximately 0.57 millimeters and 0.7 millimeters. Still yet, the length of the tape bearing surface 309 may be selected to be substantially 0.63 millimeters. It should be noted that these lengths are set forth for illustrative purposes, and any desired lengths may be employed which are capable of reducing the undesired relationship between the resolution of the magnetic tape head system 300 and the velocity of the tape 108.

In another embodiment a tape wrap angle 310 may be defined by the tape bearing surface. In particular, the tape wrap angle 310 may be defined by a horizontal plane and a plane 311 in which the tape bearing surface 309 resides. As an option, the tape wrap angle 310 may be selected to be between approximately 0.5 degrees and 1.3 degrees. Moreover, the tape wrap angle 310 may be selected to be between approximately 0.8 degrees and 0.9 degrees. Again, it should be noted that these angles 310 are set forth for illustrative purposes, and any desired angles 310 may be employed which are capable of reducing the undesired relationship between a resolution of the magnetic tape head system 300 and a velocity of the tape 108.

As an option, a pair of outriggers 314 may be used for defining an angle in which the tape 308 approaches the head 306. As yet another option, a distance between end edges of the row bars 304 may be selected to be between approximately 0.6 millimeters and 0.8 millimeters.

With the foregoing parameters adjusted in the abovementioned manner, the undesired relationship between the resolution of the magnetic tape head system 300 and the velocity of the tape 108 is abated. Still yet, the effects of tents and tape lifting are also minimized.

Figure 4:
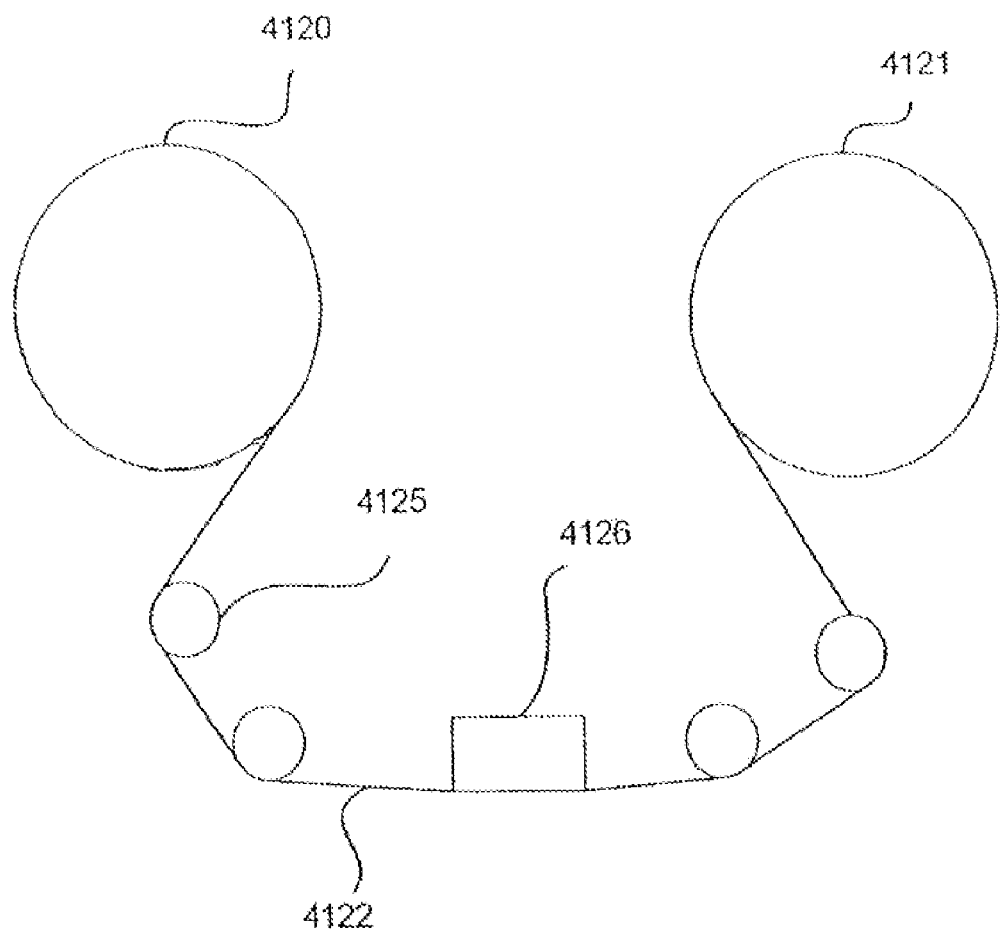
FIG. 4 illustrates a tape drive which may be employed with the tape head system of FIG. 3 for one embodiment of the present invention.

FIG. 4 illustrates a tape drive which may be employed with the tape head system 300 of FIG. 3 for one embodiment of the present invention. A tape supply cartridge 4120 and a take-up reel 4121 are provided to support a tape 4122. Moreover, guides 4125 guide the tape 4122 across a bidirectional tape head 4126.

A tape drive, such as that illustrated in FIG. 4, includes drive motor(s) to drive the tape supply cartridge 4120 and the take-up reel 4121 to move the tape 4122 linearly over the head 4126. The tape drive also includes a read/write channel to transmit data to the head 4126 to be recorded on the tape 4122 and to receive data read by the head 4126 from the tape 4122. An interface is also provided for communication between the tape drive and a host to send and receive the data and for controlling the operation of the tape drive and communicating the status of the tape drive to the host, all as understood by those of skill in the art.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for specifying manufacture of a magnetic tape head system having two individual head assemblies coupled together in opposing relationship, each head assembly including a row bar with a head situated therein defining a tape bearing surface which defines a tape wrap angle, the method comprising:

specifying a tape wrap angle defined between a horizontal plane and a plane in which each tape bearing surface resides, wherein the selected tape wrap angle is between approximately 0.5 degrees and 1.3 degrees; and specifying a distance between end edges of the row bars to be between approximately 0.6 millimeters and 0.8 millimeters.

2. The method as recited in claim 1, further comprising specifying a length of each tape bearing surface in a direction parallel to a direction of tape travel to be between approximately 0.57 millimeters and 0.7 millimeters.

3. The method as recited in claim 1, further comprising specifying a tape guide position such that a tape approaches the head at an external wrap angle, a combination of the tape wrap angle and the external wrap angle being greater than the tape wrap angle.

4. A method for manufacturing a magnetic tape head system, comprising:

coupling together two individual head assemblies in opposing relationship, each head assembly including a row bar with a head situated therein for defining a tape bearing surface which defines a tape wrap angle with respect to a horizontal plane;

wherein a length of the tape bearing surface and the tape wrap angle is selected such that a resolution of the magnetic tape head system is substantially independent of a velocity of a tape, wherein the tape wrap angle is defined between a horizontal plane and a plane in which the tape bearing surface resides, wherein the tape wrap angle is between approximately 0.5 degrees and 1.3 degrees, wherein a distance between end edges of the row bars is between approximately 0.6 millimeters and 0.8 millimeters.

5. The method as recited in claim 4, wherein the tape bearing surface length is defined as a distance between edges of the tape bearing surface.

6. The method as recited in claim 4, wherein the length of the tape bearing surface is substantially 0.63 millimeters.

7. The method as recited in claim 4, wherein the tape wrap angle is between approximately 0.8 degrees and 0.9 degrees.

8. The method as recited in claim 4, further comprising setting guides such that the tape approaches the head at an external wrap angle, a combination of the tape wrap angle and the external wrap angle being greater than the tape wrap angle.

9. The method as recited in claim 8, wherein the tape wrap angle is about the same as the external wrap angle.

10. A method for specifying manufacture of a magnetic tape head system having two individual head assemblies coupled together in opposing relationship each head assembly including a row bar with a head situated therein defining a tape bearing surface which defines a tape wrap angle, the method comprising:

specifying a length of each tape bearing surface of the head such that a resolution of the magnetic tape head system is substantially independent of a velocity of a tape passing thereacross, wherein the length of each tape bearing surface is between approximately 0.57 millimeters and 0.7 millimeters; and specifying a tape wrap angle defined between a horizontal plane and a plane in which the tape bearing surface resides, wherein the tape wrap angle is between approximately 0.5 degrees and 1.3 degrees, wherein a distance between end edges of the row bars is between approximately 0.6 millimeters and 0.8 millimeters.

11. The method as recited in claim 10, wherein the specified tape wrap angle is selected such that a resolution of the magnetic tape head system is substantially independent of a velocity of the tape.

12. The method as recited in claim 10, wherein the specified tape wrap angle is between approximately 0.8 degrees and 0.9 degrees.

13. The method as recited in claim 10, further comprising specifying a tape guide position such that the tape approaches the head at an external wrap angle, a combination of the specified tape wrap angle and the external wrap angle being greater than the specified tape wrap angle. the tape bearing surface is substantially 0.63 millimeters.

14. The method as recited in claim 13, wherein the tape wrap angle is about the same as the external wrap angle.

* * * * *